(12) United States Patent
Kimura et al.

(10) Patent No.: US 12,258,893 B2
(45) Date of Patent: Mar. 25, 2025

(54) HEAT EXCHANGE MEMBER, HEAT EXCHANGER AND HEAT CONDUCTIVE MEMBER

(71) Applicant: NGK INSULATORS, LTD., Nagoya (JP)

(72) Inventors: Daisuke Kimura, Nagoya (JP); Tatsuo Kawaguchi, Mizuho (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/645,476

(22) Filed: Dec. 22, 2021

(65) Prior Publication Data

US 2022/0275740 A1    Sep. 1, 2022

(30) Foreign Application Priority Data

Feb. 26, 2021 (JP) .................................. 2021-030842
Sep. 14, 2021 (JP) .................................. 2021-149703

(51) Int. Cl.
*F28F 7/02* (2006.01)
*B01D 46/24* (2006.01)
(Continued)

(52) U.S. Cl.
CPC ....... *F01N 3/0222* (2013.01); *B01D 46/2418* (2013.01); *F28D 7/106* (2013.01);
(Continued)

(58) Field of Classification Search
CPC .......... F28F 21/04; F28F 7/02; F28F 2265/26; F28D 21/0003
See application file for complete search history.

(56) References Cited

U.S. PATENT DOCUMENTS

2004/0166035 A1    8/2004  Noda et al.
2012/0241439 A1*   9/2012  Hashimoto .............. F01M 5/00
                                                    219/541
(Continued)

FOREIGN PATENT DOCUMENTS

CN      110006274 A        7/2019
JP      2008292017 A   *  12/2008
(Continued)

OTHER PUBLICATIONS

German Office Action (with English translation) dated Jun. 20, 2023 (Application No. 10 2022 200 211.3).
(Continued)

*Primary Examiner* — Eric S Ruppert
(74) *Attorney, Agent, or Firm* — BURR PATENT LAW, PLLC

(57) ABSTRACT

A heat exchange member includes: a honeycomb structure including: an outer peripheral wall; and partition walls arranged on an inner side of the outer peripheral wall, the partition walls defining a plurality of cells each extending from a first end face to a second end face to form a flow path for a first fluid; and a covering member being configured to cover an outer peripheral surface of the outer peripheral wall. In a cross section of the honeycomb structure orthogonal to a flow path direction for the first fluid, the partition walls include first partition walls extending in a radial direction and second partition walls extending in a circumferential direction. A part of at least one of the outer peripheral wall and the second partition walls includes at least one slit 30.

19 Claims, 12 Drawing Sheets

(51) Int. Cl.
  *F01N 3/022*   (2006.01)
  *F28D 7/10*    (2006.01)
  *F28D 7/16*    (2006.01)
  *F28D 21/00*   (2006.01)
  *F28F 1/40*    (2006.01)
  *F28F 13/06*   (2006.01)
  *F28F 21/04*   (2006.01)

(52) U.S. Cl.
  CPC ......... *F28D 7/163* (2013.01); *F28D 21/0003* (2013.01); *F28F 1/40* (2013.01); *F28F 7/02* (2013.01); *F28F 13/06* (2013.01); *F28F 21/04* (2013.01)

(56) References Cited

U.S. PATENT DOCUMENTS

| 2013/0213620 A1 | 8/2013 | Miyazaki et al. |
| 2019/0204031 A1 | 7/2019 | Kawaguchi et al. |
| 2019/0277570 A1* | 9/2019 | Kawaguchi ............. F28F 21/04 |

FOREIGN PATENT DOCUMENTS

| JP | 2014-129890 A | 7/2014 |
| JP | 2019-120488 A | 7/2019 |
| WO | 2019/135312 A1 | 7/2019 |

OTHER PUBLICATIONS

Chinese Office Action dated Jun. 6, 2024 (Application No. 202111579447.5).

Japanese Office Action (with English translation) dated Nov. 11, 2024 (Application No. 2021-149703).

\* cited by examiner

Example 1  Example 2  Example 3

Example 4  Example 5

HEAT EXCHANGE MEMBER, HEAT EXCHANGER AND HEAT CONDUCTIVE MEMBER

FIELD OF THE INVENTION

The present invention relates to a heat exchange member, a heat exchanger and a heat conductive member.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

As the above system, for example, there is a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

For example, Patent Literature 1 proposes a heat exchange member including: a honeycomb structure having partition walls defining cells each penetrating from a first end face to a second end face to form a flow path for a first fluid, and an outer peripheral wall; and a covering member being configured to cover the outer peripheral wall of the honeycomb structure, wherein in a cross section of the pillar shaped honeycomb structure perpendicular to a flow path direction for the first fluid, the partition walls have first partition walls extending in a radial direction and second partition walls extending in a circumferential direction, and the number of the first partition walls on a central portion side is less than that of the first partition walls on the outer peripheral wall side, and a heat exchanger including the heat exchange member.

CITATION LIST

Patent Literature

[Patent Literature 1] Japanese Patent Application Publication No. 2019-120488 A

SUMMARY OF THE INVENTION

The present invention is specified as follows:
The present invention relates to a heat exchange member, comprising:
a honeycomb structure comprising: an outer peripheral wall; and partition walls arranged on an inner side of the outer peripheral wall, the partition walls defining a plurality of cells, each of the plurality of cells extending from a first end face to a second end face to form a flow path for a first fluid; and
a covering member being configured to cover an outer peripheral surface of the outer peripheral wall,
wherein in a cross section of the honeycomb structure orthogonal to a flow path direction for the first fluid, the partition walls comprise first partition walls extending in a radial direction and second partition walls extending in a circumferential direction, and
wherein a part of at least one of the outer peripheral wall and the second partition walls comprises at least one slit.

The present invention also relates to a heat exchange member, comprising:
a hollow honeycomb structure comprising: an outer peripheral wall; an inner peripheral wall; and partition walls arranged between the outer peripheral wall and the inner peripheral wall, the partition walls defining a plurality of cells, each of the plurality of cells extending from a first end face to a second end face to form a flow path for a first fluid; and
a covering member being configured to cover an outer peripheral surface of the outer peripheral wall,
wherein in a cross section of the honeycomb structure orthogonal to a flow path direction for the first fluid, the partition walls comprise first partition walls extending in a radial direction and second partition walls extending in a circumferential direction, and
wherein a part of at least one of the outer peripheral wall, the inner peripheral wall and the second partition walls comprises at least one slit.

The present invention also relates to a heat exchanger, comprising:
the heat exchange member; and
an outer cylinder arranged at an interval on a radially outer side of the covering member so that a second fluid can circulate around an outer periphery of the covering member.

The present invention also relates to a heat conductive member, comprising a honeycomb structure comprising: an outer peripheral wall; and partition walls arranged on an inner side of the outer peripheral wall, the partition walls defining a plurality of cells, each of the plurality of cells extending from a first end face to a second end face to form a flow path for a first fluid,
wherein the outer peripheral wall and the partition walls comprise a Si-SiC material based on SiC particles as an aggregate, wherein a metal Si is contained between the SiC particles,
wherein in a cross section of the honeycomb structure orthogonal to a flow path direction for the first fluid, the partition walls comprise first partition walls extending in a radial direction and second partition walls extending in a circumferential direction, and
wherein a part of at least one of the outer peripheral wall and the second partition walls comprises at least one slit.

The present invention also relates to a heat conductive member, comprising a hollow honeycomb structure comprising: an outer peripheral wall; an inner peripheral wall; and partition walls arranged between the outer peripheral wall and the inner peripheral wall, the partition walls defining a plurality of cells, each of the plurality of cells extending from a first end face to a second end face to form a flow path for a first fluid,
wherein the outer peripheral wall, the inner peripheral wall, and the partition walls comprise a Si—SiC material based on SiC particles as an aggregate, wherein a metal Si is contained between the SiC particles,
wherein in a cross section of the honeycomb structure orthogonal to a flow path direction for the first fluid, the partition walls comprise first partition walls extending in a radial direction and second partition walls extending in a circumferential direction, and wherein a part of at least one of the outer peripheral wall, the inner peripheral wall and the second partition walls comprises at least one slit.

DETAILED DESCRIPTION OF THE INVENTION

In the heat exchange member described in Patent Literature 1, the number of the first partition walls on the central portion side of the honeycomb structure is lower than that of the first partition walls on the outer peripheral side, which can make it easier to form the cells on the central portion side of the honeycomb structure as well, thereby achieving both improvement of a heat recovery efficiency and suppression of an increase in pressure loss.

However, the honeycomb structure used in the heat exchange member has a problem that thermal stresses concentrate on the second partition walls extending in the circumferential direction and the outer peripheral wall, as compared to the first partition walls extending in the radial direction, and cracks are easily generated.

The present invention has been made to solve the above problems. An object of the present invention is to provide a heat exchange member and a heat exchanger which can achieve both an increase in a heat recovery efficiency and suppression of an increase in pressure loss, while suppressing generation of cracks in the honeycomb structure. The present invention also provides a heat conductive member that can be mounted on the heat exchange member and the heat exchanger as described above.

According to the present invention, it is possible to provide a heat exchange member and a heat exchanger which can achieve both an increase in a heat recovery efficiency and suppression of an increase in pressure loss, while suppressing generation of cracks in the honeycomb structure. Also, according to the present invention, it is possible to provide a heat conductive member that can be mounted on the heat exchange member and the heat exchanger as described above.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Embodiment 1

(1) Heat Exchange Member and Heat Conductive Member

Figure 1:
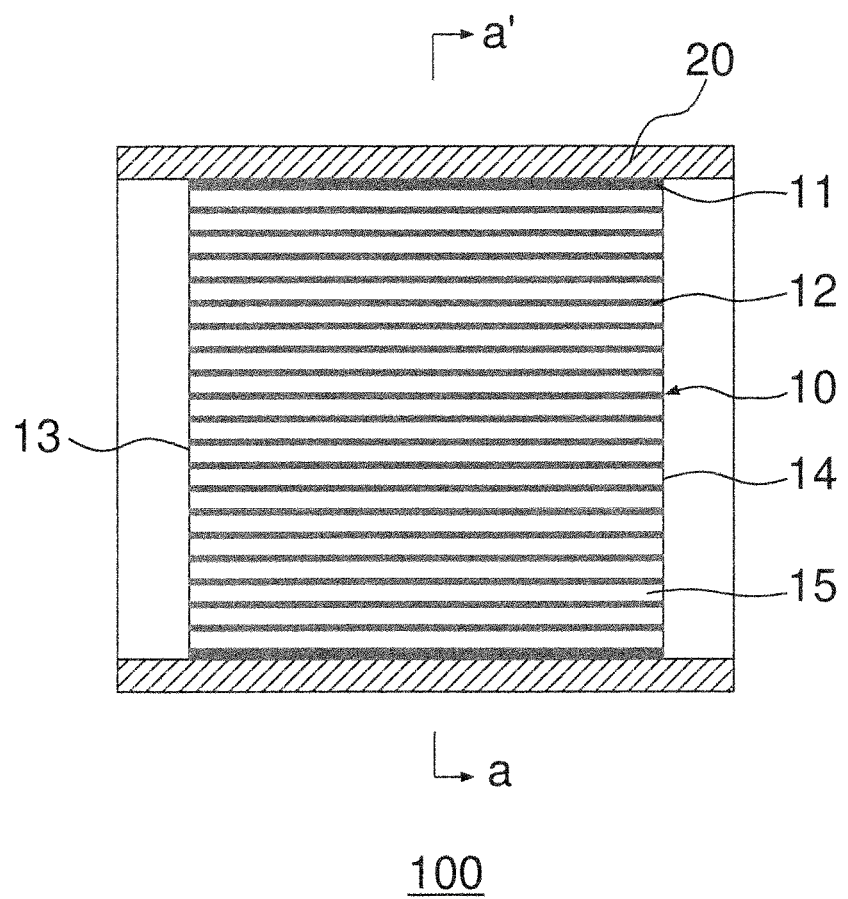
FIG. 1 is a cross-sectional view of a heat exchange member according to Embodiment 1 of the present invention, which is parallel to an axial direction of a honeycomb structure.
Figure 2:
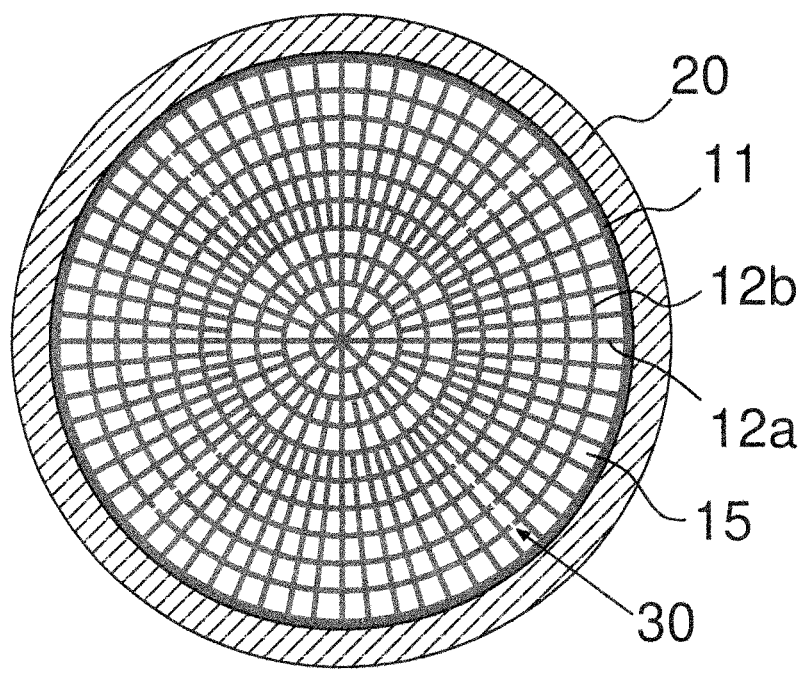
FIG. 2 is a cross-sectional view taken along the line a-a' in the heat exchange member shown in FIG. 1.
Figure 3:
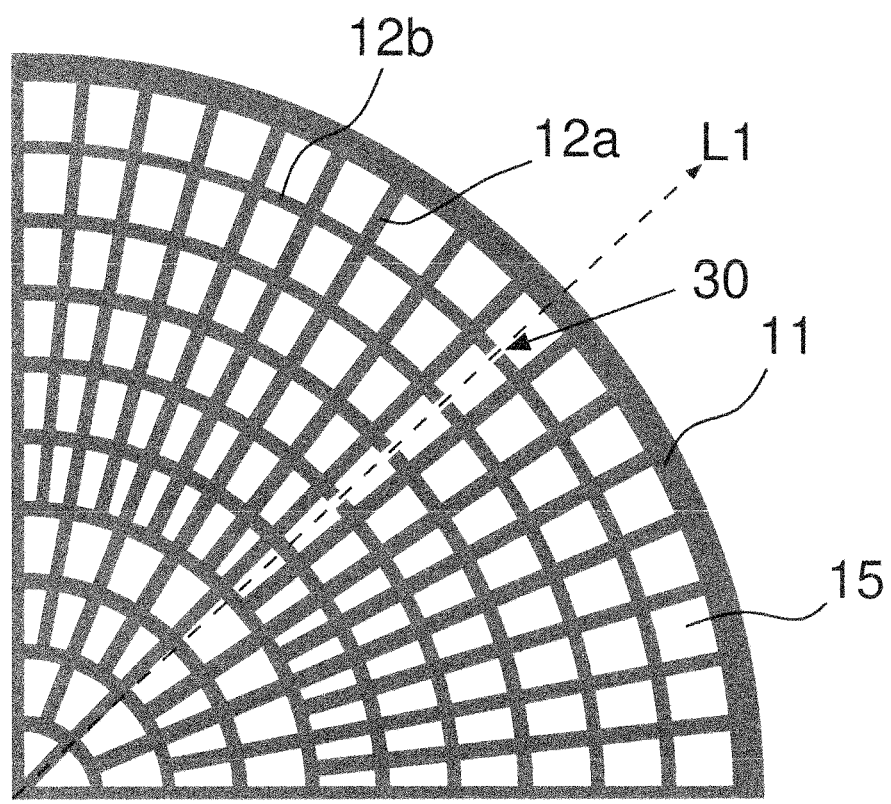
FIG. 3 is a partially enlarged view of a honeycomb structure forming the heat exchange member shown in FIG. 2.

FIG. 1 is a cross-sectional view of a heat exchange member according to Embodiment 1 of the present invention, which is parallel to an axial direction of a honeycomb structure. FIG. 2 is a cross-sectional view taken along the line a-a' in the heat exchange member shown in FIG. 1 that is, a cross sectional view of the heat exchanger member according to Embodiment 1 of the present invention orthogonal to the flow path direction (axial direction) for the first fluid of the honeycomb structure. FIG. 3 is a partially enlarged view of the honeycomb structure forming the heat exchange member shown in FIG. 2.

A heat exchange member 100 according to Embodiment 1 of the present invention includes: a honeycomb structure 10 including: an outer peripheral wall 11; and partition walls 12 arranged on an inner side of the outer peripheral wall 11, the partition walls 12 defining a plurality of cells 15 each extending from a first end face 13 to a second end face 14 to form a flow path for a first fluid; and a covering member 20 being configured to cover an outer peripheral surface of the outer peripheral wall 11. In the heat exchange member 100 having such a structure, heat exchange between the first fluid that can flow though the cells 15 and a second fluid that can flow over an outer periphery of the covering member 20 is performed via the outer peripheral wall 11 of the honeycomb structure 10 and the covering member 20. It should be noted that in FIG. 1, the first fluid can flow in both right and left directions on a page surface of FIG. 1. The first fluid is not particularly limited, and various liquids or gases may be used. For example, when the heat exchange member 100 is used for a heat exchanger mounted on a motor vehicle, the first fluid is preferably an exhaust gas.

Among members of the heat exchange member 100 according to Embodiment 1 of the present invention, the member excluding the covering member 20 is referred to as a heat conductive member. In other words, the heat conductive member according to Embodiment 1 of the present invention has the honeycomb structure 10 including: the outer peripheral wall 11; and the partition walls 12 arranged on an inner side of the outer peripheral wall 11, the partition walls 12 defining the plurality of cells 15 each extending from the first end face 13 to the second end face 14 to form the flow path for the first fluid.

The partition walls 12 that form the honeycomb structure 10 includes first partition walls 12a extending in a radial direction and second partition walls 12b extending in a circumferential direction in a cross section of the honeycomb structure 10 orthogonal to a flow path direction for the first fluid (i.e., the cross section shown in FIG. 2). Such a structure can allow the heat of the first fluid to be transferred in the radial direction through the first partition walls 12a, so that the heat of the first fluid can be efficiently transferred to the outside of the honeycomb structure 10.

In the honeycomb structure 10 having the structure described above, thermal stresses that are drawn in the circumferential direction are applied to the second partition walls 12b and the outer peripheral wall 11 when the entire honeycomb structure 10 undergoes thermal expansion in the radial direction. Since the thermal stresses drawn in the circumferential direction are higher than those drawn in the radial direction, the thermal stresses concentrate on the second partition walls 12b and the outer peripheral wall 11, so that cracks are easily generated.

Therefore, a part of at least one of the outer peripheral wall 11 and the second partition walls 12b that form the honeycomb structure 10 is provided with slits 30. Thus, the provision of the slits 30 relaxes the thermal stresses applied to at least one of the second partition walls 12b and the outer peripheral wall 11, thus enabling the generation of cracks to be suppressed.

Figure 4:
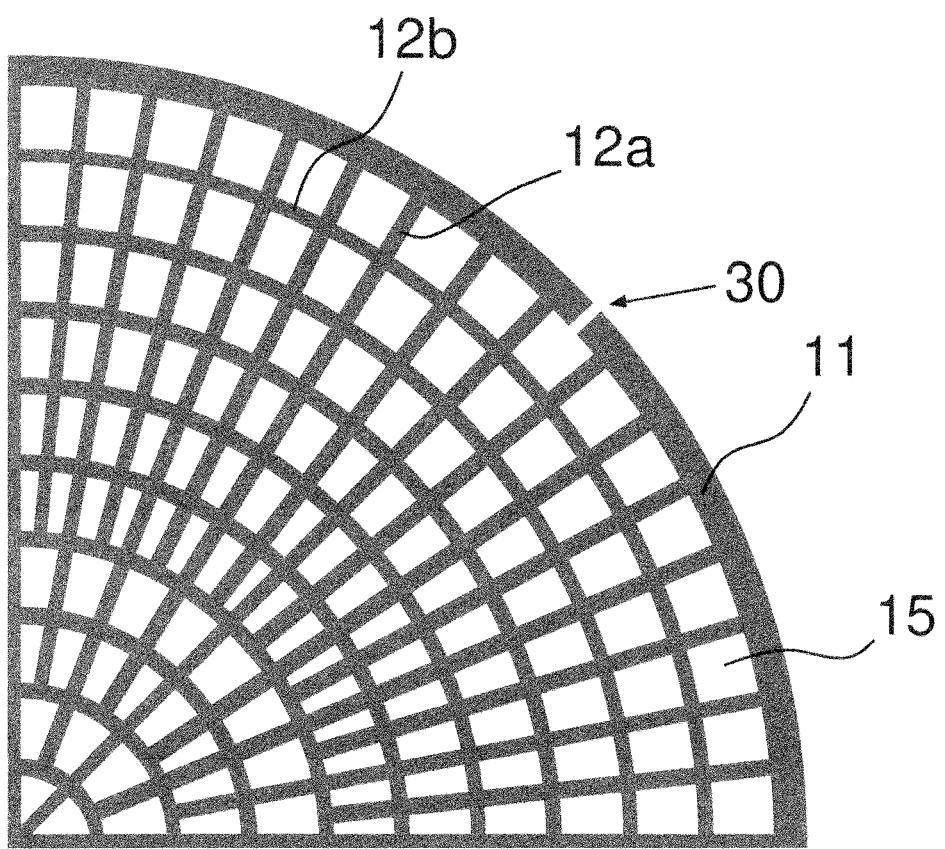
FIG. 4 is a partially enlarged view of another honeycomb structure that can be used for the heat exchange member shown in FIGS. 1 and 2.
Figure 5:
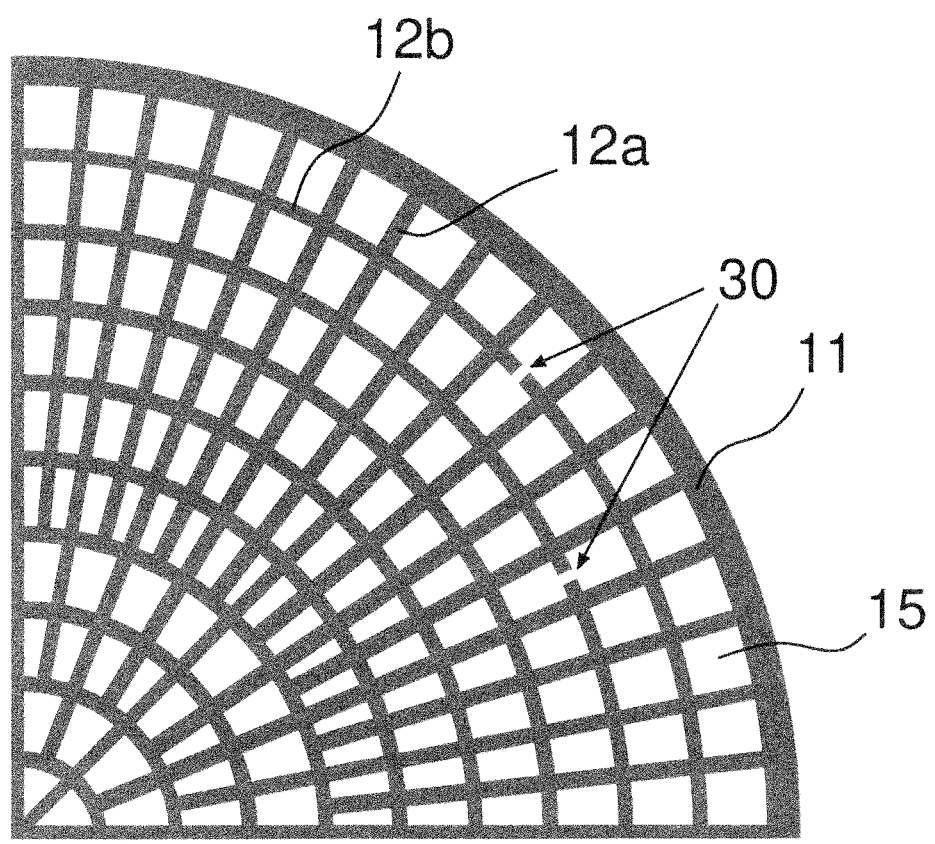
FIG. 5 is a partially enlarged view of another honeycomb structure that can be used for the heat exchange member shown in FIGS. 1 and 2.
Figure 6:
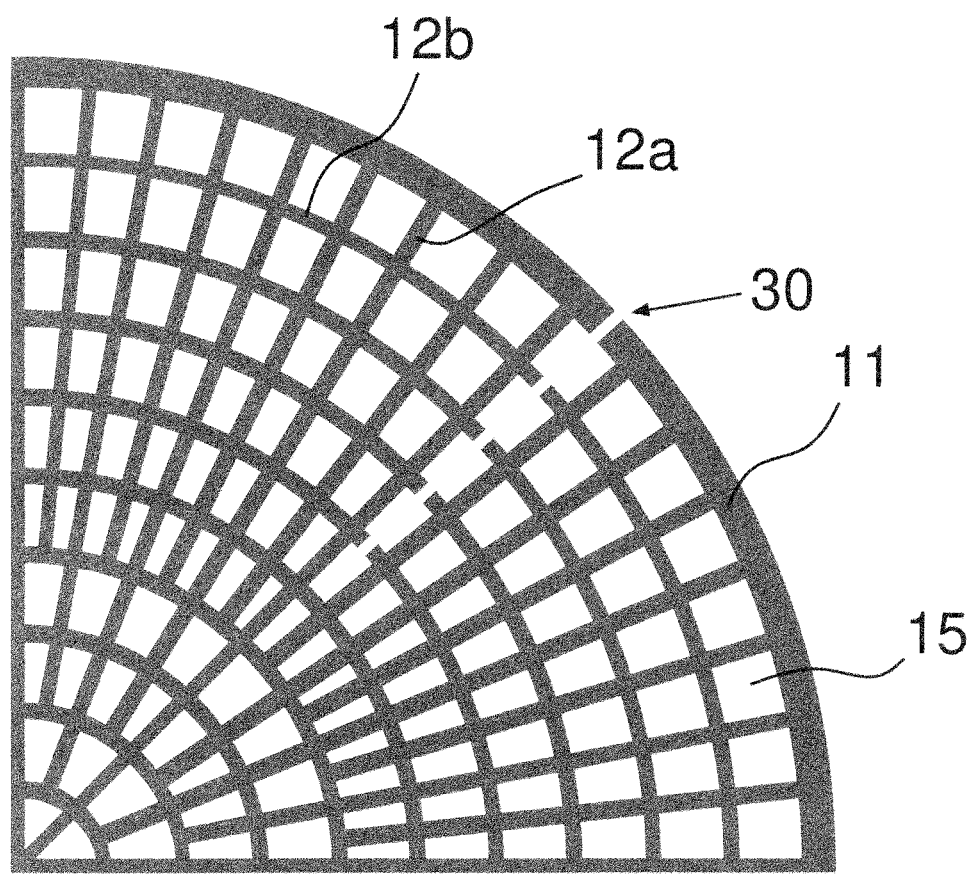
FIG. 6 is a partially enlarged view of another honeycomb structure that can be used for the heat exchange member shown in FIGS. 1 and 2.

The slits 30 can be provided in a part of the outer peripheral wall 11 or the second partition walls 12b, where thermal stresses concentrate and cracks easily occur, as shown in FIGS. 2-5, or in a part of the outer peripheral wall 11 and the second partition walls 12b, as shown in FIG. 6. Among them, it is preferable to provide the slits 30 in: (i) a part of the outer peripheral wall 11 and the second partition walls 12b; or (ii) a part of the second partition walls 12b; it is more preferable to provide the slits 30 in (i) a part of the outer peripheral wall 11 and the second partition walls 12b, in particular from the viewpoint of suppressing cracks in both the outer peripheral wall 11 and the second partition walls 12b. Each of FIGS. 4-6 shows a partially enlarged view of the honeycomb structure that can be used for the heat exchange member 100 and the heat conductive member, as in FIG. 3.

The length of each slit 30 in the axial direction of the honeycomb structure 10 (in the flow path direction for the first fluid) is not particularly limited. It may be the same as the axial length of the honeycomb structure 10 or shorter than the axial length of the honeycomb structure 10.

The width of each slit 30 in the cross section of the honeycomb structure 10 orthogonal to the flow path direction for the first fluid is not particularly limited. It may be the same as the length between the two first partition walls 12a, or may be shorter than the length between the two first partition walls 12a.

The number of the slits 30 provided in a part of at least one of the outer peripheral wall 11 and the second partition walls 12b is not particularly limited, but an increased number of slits 30 provided can lead to more effective relaxation of thermal stresses. However, an excessive large number of slits 30 may result in reduced strength of the honeycomb structure 10. Therefore, it is preferable to set the number of slits 30 depending on the size of the honeycomb structure 10 and the number of partition walls 12.

The slits 30 are preferably slits 30 that are provided in a part of the second partition walls 12b and are continuous in the radial direction. Such slits 30 can be easily formed by a general processing method, thereby improving the productivity of the heat exchange member 100 and the heat conductive member.

As used herein, "slits 30 continuous in the radial direction" means that a plurality of slits 30 continuous on a line L1 extending in the radial direction are located in the cross section of the honeycomb structure 10 orthogonal to the flow path direction for the first fluid, as shown in FIG. 3.

The slits 30 continuous in the radial direction may also be continuous to the outer peripheral wall 11, as shown in FIG. 6. Even in such a structure, the slits 30 can be easily formed by the general processing method, thereby improving the productivity of the heat exchange member 100 and the heat conductive member.

Assuming that the number of the second partition walls 12b in the radial direction is n, the slits 30 continuous in the radial direction are preferably provided on n×0.3 or more (provided that the decimal point is truncated) second partition walls 12b from the outer peripheral wall 11 side, and the slits 30 are more preferably provided on n×0.4 or more (provided that the decimal point is truncated) second partition walls 12b. Such a structure can allow cracks in the second partition walls 12b to be stably suppressed. As the number of the second partition walls 12b provided with the slits 30 continuous in the radial direction is larger, the pressure loss can be more reduced. The reduced pressure loss results in a decreased flow rate of the first fluid passing through the cells 15, which increases a contacting time of the partition walls 12 with the first fluid, thus improving the heat recovery performance. The upper limit of the number of second partition walls 12b provided with the slits 30 continuous in the radial direction may be, but not limited to, n or less (i.e., all the second partition walls 12b may be provided with the slits 30 continuous in the radial direction), and preferably n×0.7 or less (provided that the decimal point is rounded down). The number of the second partition walls 12b in the radial direction may preferably be from 5 to 30, and more preferably from 10 to 20, although it depends on the outer diameter of the honeycomb structure 10.

For example, in the honeycomb structure 10 as shown in FIGS. 1-4, the number of the second partition walls 12b in the radial direction is 9 (n=9), so that two or more second partition walls 12b from the outer peripheral wall 11 side are preferably provided with the slits 30 continuous in the radial direction. Each of FIGS. 2 and 3 shows, as an example, a case where four second partition walls 12b from the outer peripheral wall 11 side are provided with the slits 30 continuous in the radial direction. Further FIG. 6 shows, as an example, a case where the outer peripheral wall 11 and the four second partition walls 12b from the outer peripheral wall 11 side are provided with the slits 30 continuous in the radial direction.

The number of slits 30 in the circumferential direction is preferably from 3 to 10, and more preferably from 4 to 8, although not limited thereto. The controlling of the number of slits 30 in the circumferential direction to that number can enhance the effect of suppressing cracks while ensuring the strength of the honeycomb structure 10. Further, a larger number of slits 30 in the circumferential direction can lead to reduced pressure loss. The reduced pressure loss can decrease the flow rate of the first fluid passing through the cells 15 and increase the contacting time of the partition walls 12 with the first fluid, thus improving the heat recovery performance.

The "number of slits 30 in the circumferential direction" as used herein is the number of slits 30 in the circumferential direction when the number of the second partition walls 12b in a region located between the two first partition walls 12a is one. For example, FIG. 2 shows a case where the number of slits in the circumferential direction is four, as an example.

An outer shape of the honeycomb structure 10 is not particularly limited as long as the first fluid can flow though the cells 15 from the first end face 13 to the second end face 14. Examples of the outer shape include a cylindrical shape, an elliptic pillar shape, a quadrangular pillar shape or other polygonal pillar shapes. Thus, the outer shape of the honeycomb structure 10 in the cross section orthogonal to the flow path direction for the first fluid may be circular, elliptical, quadrangular or other polygonal. It should be noted that each of FIGS. 1 and 2 shows a case where the outer shape of the honeycomb structure 10 is cylindrical, and its cross-sectional shape is circular, as an example.

The number of first partition walls 12a on the central portion side of the honeycomb structure 10 is preferably less than the number of first partition walls 12a on the outer peripheral wall 11 side of the honeycomb structure 10. Such a structure enables the cells 15 to be easily formed on the central portion side of the honeycomb structure 10. This can suppress the increase in pressure loss of the heat exchange member 100 and the heat conductive member, which is caused by the difficulty in forming the cells 15 on the central portion side of the honeycomb structure 10.

The "number of first partition walls 12a on the central portion side of the honeycomb structure 10" as used herein refers to the total number of the first partition walls 12a forming the plurality of cells 15 in the region having the plurality of cells 15 aligned in the circumferential direction (hereinafter referred to as the "circumferential region"), which is closest to the central portion of the honeycomb structure 10 (i.e., farthest from the outer peripheral wall 11) in the cross section as shown in FIG. 2. Further, the "number of first partition walls 12a on the outer peripheral wall 11 side of the honeycomb structure 10" as used herein refers to the total number of the first partition walls 12a forming the plurality of cells 15 in the circumferential region, which is farthest from the central portion of the honeycomb structure 10 (i.e., closest to the outer peripheral wall 11) in the cross section as shown in FIG. 2.

The number of the first partition walls 12a on the outer peripheral wall 11 side of the honeycomb structure 10 is preferably from 100 to 500, and more preferably from 200 to 300, in terms of the heat recovery efficiency. Furthermore, the number of the second partition walls 12b of the honeycomb structure 10 is preferably from 500 to 4000, and more preferably from 1000 to 3000, in terms of relaxing the thermal stress and ensuring the strength.

The thickness of each partition wall 12a is preferably higher than that of each partition wall 12b. Since the thickness of the partition wall 12 correlates with the thermal conductivity, such a structure can allow a heat transfer quantity of the partition walls 12a to be higher than that of the partition walls 12b. As a result, the heat of the first fluid passing through the cells 15 can be efficiently transferred to the outside of the honeycomb structure 10.

It should be noted that the thicknesses of the partition walls 12 (the partition walls 12a and the partition walls 12b) are not particularly limited, and they may be appropriately adjusted depending on applications or the like. The thickness of the partition wall 12 may preferably be from 0.1 to 1 mm, and more preferably from 0.2 to 0.6 mm. The thickness of the partition wall 12 of 0.1 mm or more can provide the honeycomb structure 10 with a sufficient mechanical strength. Further, the thickness of the partition wall 12 of 1 mm or less can prevent problems that the pressure loss is increased due to a decrease in an opening area and the heat recovery efficiency is decreased due to a decrease in a contact area with the first fluid.

In the heat exchange member 100 and the heat conductive member, the outer peripheral wall 11 of the honeycomb structure 10 is exposed to external impacts, thermal stress due to a temperature difference between the first and second fluids, and so on. Therefore, from the viewpoint of ensuring resistance to those external impacts, the outer peripheral wall 11 preferably has a thickness larger than that of each of the partition walls 12 (the first partition walls 12a and the second partition walls 12b). Such a structure can suppress breakage (e.g., cracking, chinking, and the like) of the outer peripheral wall 11 due to the external impacts.

The thickness of the outer peripheral wall 11 is not particularly limited, and it may be appropriately adjusted according to applications and the like. For example, the thickness of the outer peripheral wall 11 is preferably more than 0.3 mm and 10 mm or less when using the heat exchange member 100 and the heat conductive member for general heat exchange applications, and more preferably from 0.5 mm to 5 mm, and even more preferably from 1 mm to 3 mm. Moreover, when using the heat exchange member 100 and the heat conductive member for a thermal storage application, the thickness of the outer peripheral wall 11 is preferably 10 mm or more, in order to increase a heat capacity of the outer peripheral wall 11.

The partition walls 12 and the outer peripheral wall 11 are based on ceramics. The phrase "based on ceramics" means that a ratio of a mass of ceramics to the total mass of the partition walls 12 and the outer peripheral wall 11 is 50% by mass or more.

Each of the partition walls 12 and the outer peripheral wall 11 preferably has a porosity of 10% or less, and more preferably 5% or less, and even more preferably 3% or less. Further, the porosity of the partition walls 12 and the outer peripheral wall 11 may be 0%. The porosity of the partition walls 12 and the outer peripheral wall 11 of 10% or less can lead to improved thermal conductivity.

The partition walls 12 and the outer peripheral wall 11 are preferably based on SiC (silicon carbide) having high thermal conductivity. The phrase "based on SiC (silicon carbide)" means that a ratio of a mass of SiC (silicon carbide) to the total mass of the partition walls 12 and the outer peripheral wall 11 is 50% by mass or more.

More particularly, the material of each of the partition walls 12 and the outer peripheral wall 11 that can be used herein includes Si-impregnated SiC, (Si+Al) impregnated SiC, metal composite SiC, recrystallized SiC, $Si_3N_4$, SiC, and the like. Among them, Si—SiC material (sintered body), which based on SiC particles as an aggregate and contains metal Si between the SiC particles, is preferable because it can be produced at low cost and has high thermal conductivity. Specifically, Si-impregnated SiC and (Si+Al) impregnated SiC are preferred as the materials. As used herein, the phrase "based on SiC as an aggregate" means that a ratio of SiC particles to the total mass of the aggregate is 50% by mass or more, and preferably 70% by mass or more, and more preferably 80% by mass or more, and even more preferably 95% by mass or more.

A cell density (that is, the number of cells 15 per unit area) in the cross section orthogonal to the flow path direction for the first fluid is not particularly limited. The cell density may be adjusted as needed, and preferably in a range of from 4 to 320 cells/$cm^2$. The cell density of 4 cells/$cm^2$ or more can sufficiently ensure the strength of the partition walls 12, hence the strength of the honeycomb structure 10 itself and effective GSA (geometrical surface area). Further, the cell density of 320 cells/cm$^2$ or less can allow an increase in a pressure loss to be prevented when the first fluid flows.

The honeycomb structure 10 preferably has an isostatic strength of more than 5 MPa, and more preferably 10 MPa or more, and more preferably 100 MPa or more. The isostatic strength of the honeycomb structure 10 of more than 5 MPa can lead to the honeycomb structure 10 having improved durability. The isostatic strength of the honeycomb structure 10 can be measured according to the method for measuring isostatic fracture strength as defied in the JASO standard M 505-87 which is a motor vehicle standard issued by Society of Automotive Engineers of Japan, Inc.

A diameter of the honeycomb structure 10 in the cross section orthogonal to the flow path direction for the first fluid may preferably be from 20 to 200 mm, and more preferably from 30 to 100 mm. Such a diameter can allow improvement of heat recovery efficiency. If the cross-sectional shape of the honeycomb structure 10 is not circular, the diameter of the largest inscribed circle inscribed in the cross-sectional shape of the honeycomb structure 10 is defined as the diameter of the honeycomb structure 10 in that cross section.

The length of the honeycomb structure 10 (length in the flow path direction for the first fluid) is not particularly limited, and it may be adjusted depending on applications. For example, the length of the honeycomb structure 10 is preferably from 3 to 200 mm, 5 to 100 mm, and even more preferably from 10 to 50 mm.

The honeycomb structure 10 preferably has a thermal conductivity of 50 W/(m·K) or more at 25° C., and more preferably from 100 to 300 W/(m·K), and even more preferably from 120 to 300 W/(m·K). The thermal conductivity of the honeycomb structure 10 in such a range can lead to an improved thermal conductivity and can allow the heat inside the honeycomb structure 10 to be efficiently transmitted to the outside. It should be noted that the value of thermal conductivity is a value measured according to the laser flash method (JIS R 1611-1997).

In the case where an exhaust gas as the first fluid flows through the cells 15 in the honeycomb structure 10, a catalyst may be supported on the partition walls 12 of the honeycomb structure 10. The supporting of the catalyst on the partition walls 12 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

The covering member 20 is not particularly limited as long as it can cover the outer peripheral surface of the outer peripheral wall 11 of the honeycomb structure 10. For example, it is possible to use a cylindrical member that is fitted into the outer peripheral surface of the outer peripheral wall 11 of the honeycomb structure 10 to cover circumferentially the outer peripheral wall 11 of the honeycomb structure 10. From the viewpoint of buffering, an inorganic mat or other material may be interposed between the honeycomb structure 10 and the covering member 20.

As used herein, the "fitted" means that the honeycomb structure 10 and the covering member 20 are fixed in a state of being suited to each other. Therefore, the fitting of the honeycomb structure 10 and the covering member 20 encompasses cases where the honeycomb structure 10 and the covering member 20 are fixed to each other by a fixing method based on fitting such as clearance fitting, interference fitting and shrinkage fitting, as well as by brazing, welding, diffusion bonding, or the like.

The covering member 20 can have an inner surface shape corresponding to the outer peripheral wall 11 of the honeycomb structure 10. Since the inner surface of the covering member 20 is in direct contact with the outer peripheral wall 11 of the honeycomb structure 10, the thermal conductivity is improved and the heat in the honeycomb structure 10 can be efficiently transferred to the covering member 20.

In terms of improvement of the heat recovery efficiency, a higher ratio of an area of a portion circumferentially covered with the covering member 20 in the outer peripheral wall 11 of the honeycomb structure 10 to the total area of the outer peripheral wall 11 of the honeycomb structure 10 is preferable. Specifically, the area ratio is preferably 80% or more, and more preferably 90% or more, and even more preferably 100% (that is, the entire outer peripheral surface of the outer peripheral wall 11 of the honeycomb structure 10 is circumferentially covered with the covering member 20).

It should be noted that the term "outer peripheral wall 11" as used herein refers to a surface of the honeycomb structure 10, parallel to the flow path direction for the first fluid, and does not include surfaces (the first end face 13 and the second end face 14) of the honeycomb structure 10, which are orthogonal to the flow path direction for the first fluid.

The covering member 20 is preferably made of a metal in terms of manufacturability. Further, the metallic covering member 20 is also preferable in that it can be easily welded to an outer cylinder 40 (casing) that will be described below. Examples of the material of the covering member 20 that can be used herein include stainless steel, titanium alloys, copper alloys, aluminum alloys, brass and the like. Among them, the stainless steel is preferable because it has high durability and reliability and is inexpensive.

The covering member 20 preferably has a thickness of 0.1 mm or more, and more preferably 0.3 mm or more, and still more preferably 0.5 mm or more, for the reason of durability and reliability. The thickness of the covering member 20 is preferably 10 mm or less, and more preferably 5 mm or less, and still more preferably 3 mm or less, for the reason of reducing thermal resistance and improving thermal conductivity.

A length of the covering member 20 (a length in the flow path direction for the first fluid) is not particularly limited, and it may be adjusted as needed depending on the size of the honeycomb structure 10 or the like. For example, the length of the covering member 20 is preferably larger than the length of the honeycomb structure 10. Specifically, the length of the covering member 20 is preferably from 5 mm to 250 mm, and more preferably from 10 mm to 150 mm, and still more preferably from 20 mm to 100 mm.

It should be noted that when the length of the covering member 20 is longer than the length of the honeycomb structure 10, the covering member 20 is preferably provided such that the honeycomb structure 10 is positioned at the central portion of the covering member 20.

Next, methods for producing the heat exchange member 100 and the heat conductive member will be described.

However, the methods for producing the heat exchange member and the heat conductive member are not limited to those described below.

First, a green body containing ceramic powder is extruded into a desired shape to prepare a honeycomb formed body. At this time, the shape and density of the cells 15, the number, lengths and thicknesses of the partition walls 12, the shapes and the thicknesses of the outer peripheral wall 11, and the like, can be controlled by selecting dies and jig in appropriate forms. The material of the honeycomb formed body that can be used herein includes the ceramics as described above. For example, when producing a honeycomb formed body based on a Si-impregnated SiC composite, a binder and water or an organic solvent are added to a predetermined amount of SiC powder, and the resulting mixture is kneaded to form a green body, which is formed into a honeycomb formed body having a desired shape. The resulting honeycomb formed body can be then dried, and the honeycomb formed body can be impregnated with metallic Si and fired under reduced pressure in an inert gas or vacuum to obtain the honeycomb structure 10 (the heat conductive member). The slits 30 may be formed during extrusion molding, or on the fired honeycomb structure 10, or on a dried honeycomb formed body before firing. When forming the slits 30 during extrusion molding, the die may be processed so that the slits 30 are formed in a part of at least one of the outer peripheral wall 11 and the second partition walls 12b. Further, when forming the slits 30 on the fired honeycomb structure 10 or on the dried honeycomb formed body before firing, a processing method known in the art may be used. The processing method that can be used herein includes, but not particularly limited to, grinding, cutting, laser processing, water-jet processing, electric discharge (EDM) processing, and the like.

The honeycomb structure 10 is then shrinkage-fitted into the covering member 20, whereby the inner peripheral surface of the covering member 20 is fitted to the outer peripheral surface of the outer peripheral wall 11 of the honeycomb structure 10. Specifically, the honeycomb structure 10 can be fixed into the covering member 20 by heating and expanding the covering material 20, inserting the honeycomb structure 10 into the covering member 20, and then cooling and shrinking the covering member 20. As described above, the fitting of the honeycomb structure 10 and the covering member 20 can be performed by, in addition to the shrinkage fitting, a fixing method based on fitting such as clearance fitting and interference fitting, or by brazing, welding, diffusion bonding or the like. Thus, the heat exchange member 10 can be obtained.

The heat exchange member 100 and the heat conductive member according to Embodiment 1 of the present invention are provided with the slits 30 in a part of at least one of the outer peripheral wall 11 and the second partition walls 12b that form the honeycomb structure 10 to relax thermal stress applied to at least one of the second partition walls 12b and the outer peripheral wall 11, so that the heat recovery efficiency can be improved and the pressure loss can be suppressed, while suppressing the generation of cracks in the honeycomb structure 10.

(2) Heat Exchanger

The heat exchanger 200 according to Embodiment 1 of the present invention includes the heat exchange member 10 as described above. A member(s) other than the heat exchange member 10 is/are not particularly limited, and a known member(s) may be used. For example, the heat exchanger 200 according to Embodiment 1 of the present invention may include an outer cylinder 40 (casing) at an interval on a radially outer side of the covering member 20 such that a second fluid can flow on the outer periphery of the covering member 20.

Figure 7:
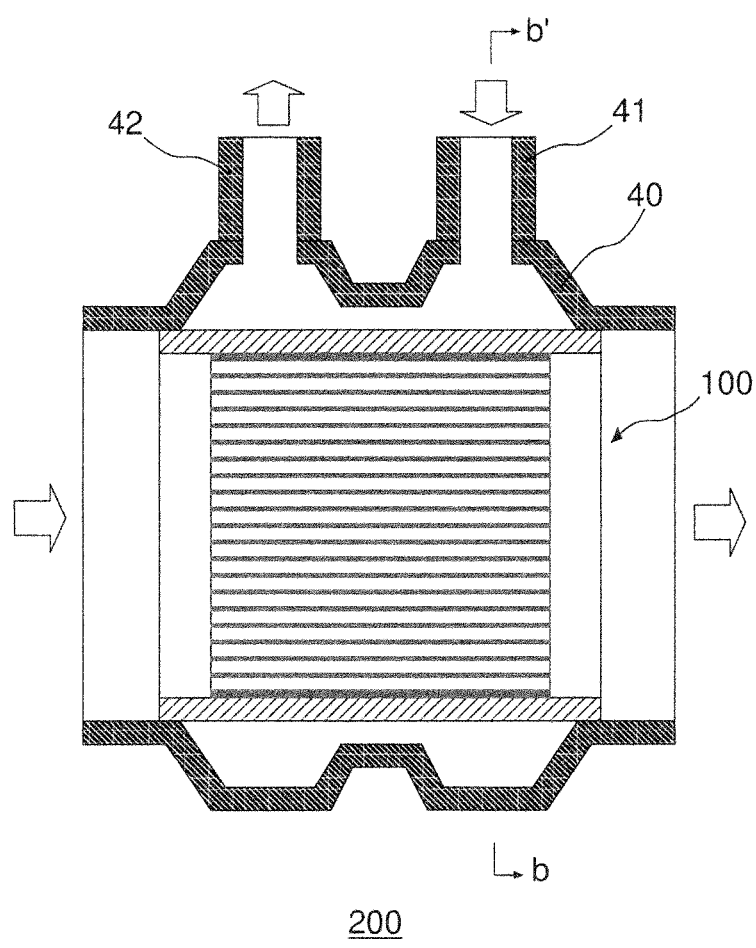
FIG. 7 is a cross-sectional view of a heat exchanger according to Embodiment 1 of the present invention, which is parallel to a flow path direction for a first fluid.
Figure 8:
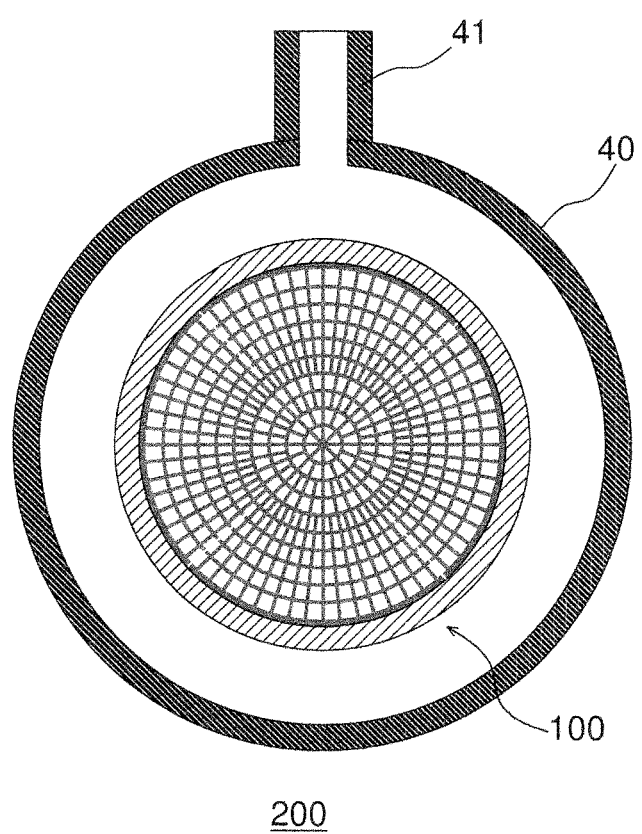
FIG. 8 is a cross-sectional view taken along the line b-b' in the heat exchanger shown in FIG. 7.

FIG. 7 is a cross-sectional view of the heat exchanger according to Embodiment 1 of the present invention, which is parallel to the flow path direction for the first fluid of the honeycomb structure. FIG. 8 is a cross-sectional view taken along the line b-b' in the heat exchanger shown in FIG. 7, that is a cross-sectional view of the heat exchanger 200 according to Embodiment 1 of the present invention, which is orthogonal to the flow path direction for the first fluid of the honeycomb structure.

A heat exchanger 200 according to Embodiment 1 of the present invention includes the heat exchange member 100; and an outer cylinder 40 arranged at an interval on the radially outer side of the covering member 20 such that the second fluid can flow on the outer periphery of the covering member 20 of the heat exchange member 100. The outer cylinder 40 has a feed pipe 41 and a discharge pipe 42 for the second fluid. It is preferable that the outer cylinder 40 circumferentially covers the entire outer periphery of the heat exchange member 100.

In the heat exchanger 200 having the above structure, the second fluid flows into the outer cylinder 40 through the feed pipe 41. Then, while passing through the flow path for the second fluid, the second fluid undergoes heat exchange with the first fluid flowing through the cells 15 of the honeycomb structure 10 via the covering member 20 of the heat exchange member 100, and then flows out from the discharge pipe 42 for the second fluid. It should be noted that the outer peripheral surface of the covering member 20 of the heat exchange member 100 may be covered with a member for adjusting a heat transfer efficiency.

The second fluid is not particularly limited, but the second fluid is preferably water or an anti-freezing solution (LLC defined in JIS K 2234: 2006) when the heat exchanger 200 is mounted on a motor vehicle. For the temperatures of the first fluid and the second fluid, the temperature of the first fluid is preferably higher than that of the second fluid, because under the temperature condition, the covering member 20 of the heat exchange member 100 does not expand at the lower temperature and the honeycomb structure 10 expands at the higher temperature, so that the two fitted members is difficult to be loosened. In particular, when the fitting of the honeycomb structure 10 and the covering member 20 is shrinkage fitting, the above temperature condition can minimize a risk that the fitted members are loosened and the honeycomb structure 10 is fallen out.

Preferably, an inner surface of the outer cylinder 40 is fitted into the outer peripheral surface of the covering member 20 of the heat exchange member 100. This can result in a structure in which the outer peripheral surface of the covering member 20 at both end portions in the flow path direction for the first fluid is circumferentially brought into close contact with the inner surface of the outer cylinder 40, so as to prevent the second fluid from leaking to the outside. A method for bringing the outer peripheral surface of the covering member 20 into close contact with the inner surface of the outer cylinder 40 includes, but not limited to, welding, diffusion bonding, brazing, mechanical fastening, and the like. Among them, the welding is preferable because it has higher durability and reliability and can improve structural strength.

The outer cylinder 40 is preferably made of a metal in terms of thermal conductivity and manufacturability.

Examples of the metal that can be used herein include stainless steel, titanium alloys, copper alloys, aluminum alloys, brass, and the like, Among them, the stainless steel is preferable because it is inexpensive and has high durability and reliability.

The outer cylinder 40 preferably has a thickness of 0.1 mm or more, and more preferably 0.5 mm or more, and still more preferably 1 mm or more, for the reasons of durability and reliability. The thickness of the outer cylinder 40 is preferably 10 mm or less, and more preferably 5 mm or less, and still more preferably 3 mm or less, in terms of cost, volume, weight and the like.

The outer cylinder 40 may be an integrally formed product, but it may preferably be a joined member formed of two or more members. In the case where the outer cylinder 40 is the joined member formed of two or more members, freedom in design for the outer cylinder 40 can be improved.

The positions of the feed pipe 41 and the discharge pipe 42 for the second fluid are not particularly limited. The positions may be changed as needed to the axial direction and the outer peripheral direction, in view of the installation position of the heat exchanger 200, the piping position, and the heat exchange efficiency. For example, the feed pipe 41 and the discharge pipe 42 for the second fluid can be provided at positions corresponding to the axial ends of the honeycomb structure 10. The feed pipe 41 and the discharge pipe 42 for the second fluid may extend toward the same direction or toward different directions.

Next, the method for producing the heat exchanger 200 will be described. However, the method for producing the heat exchanger 200 is not limited to the production method as described below.

The heat exchanger 200 can be producing by arranging the outer cylinder 40 at an interval on the radially outer side of the covering member 20 of the heat exchanger 100 and joining them such that the second fluid can circulate around the outer periphery of the covering member 20. Specifically, both ends of the covering member 20 of the heat exchange member 100 are joined to the inner surface of the outer cylinder 40. There are various joining methods, including fitting, as described above. If necessary, the joining points can be joined by welding or the like. As a result, the outer cylinder 40 is formed to circumferentially cover the outer periphery of the coating member 20, and the flow path for the second fluid is formed between the outer peripheral surface of the covering member 20 and the inner surface of the outer cylinder 40. The heat exchanger 200 can be thus obtained.

Since the heat exchanger 200 according to Embodiment 1 of the present invention includes the heat exchanger member 100 as described above, it is possible to achieve both improvement of the heat recovery efficiency and suppression of the increase in pressure loss, while suppressing the generation of cracks in the honeycomb structure.

Embodiment 2

A heat exchange member, heat exchanger, and heat conductive member according to Embodiment 2 of the present invention are different from the heat exchange member and heat exchanger according to Embodiment 1 of the present invention in that the honeycomb structure of the former is a hollow honeycomb structure. Other components are identical to those of the heat exchange member, heat exchanger, and heat conductive member according to Embodiment 1 of the present invention. Therefore, hereinafter, descriptions of the identical components will be omitted and only the differences will be described in detail. Further, the components having the same numerical numbers as those appearing in Embodiment 1 of the present invention are the same as the components in Embodiment 2 of the present invention.

Figure 9:
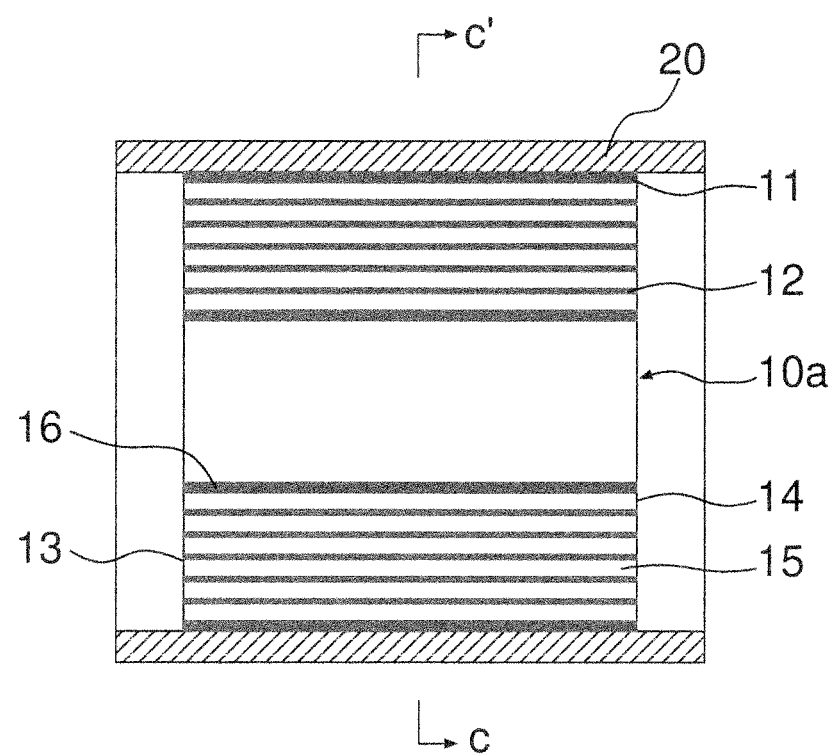
FIG. 9 is a cross-sectional view of a heat exchange member according to Embodiment 2 of the present invention, which is parallel to an axial direction of a hollow honeycomb structure.

FIG. 9 is a cross-sectional view of a hollow heat exchange member according to Embodiment 2 of the present invention, which is parallel to an axial direction of a hollow honeycomb structure. Further, FIG. 10 is a cross-sectional view taken along the line c-c' in the heat exchange member shown in FIG. 9, that is, a cross-sectional view of the heat exchange member according to Embodiment 2 of the present invention, which is orthogonal to the flow path direction for the first fluid of the hollow honeycomb structure.

A heat exchange member 300 according to Embodiment 2 of the present invention includes: a hollow honeycomb structure 10a including: an outer peripheral wall 11; an inner peripheral wall 16; and partition walls 12 arranged between the outer peripheral wall 11 and the inner peripheral wall 16, the partition walls 12 defining a plurality of cells 15 each extending from a first end face 13 to a second end face 14 to form a flow path for a first fluid; and a covering member 20 being configured to cover an outer peripheral surface of the outer peripheral wall 11. In the heat exchange member 300 having such a structure, heat exchange between the first fluid that can flow though the cells 15 and a second fluid that can flow over an outer periphery of the covering member 20 is performed via the outer peripheral wall 11 of the hollow honeycomb structure 10a and the covering member 20. It should be noted that in FIG. 9, the first fluid can flow in both right and left directions on a page surface of FIG. 9.

Among members of the heat exchange member 300 according to Embodiment 2 of the present invention, the member excluding the covering member 20 is referred to as a heat conductive member. In other words, the heat conductive member according to Embodiment 2 of the present invention has the hollow honeycomb structure 10a including: the outer peripheral wall 11; the inner peripheral wall 16; and the partition walls 12 arranged between the outer peripheral wall 11 and the inner peripheral wall 16, the partition walls 12 defining the plurality of cells 15 each extending from the first end face 13 to the second end face 14 to form the flow path for the first fluid.

Figure 10:
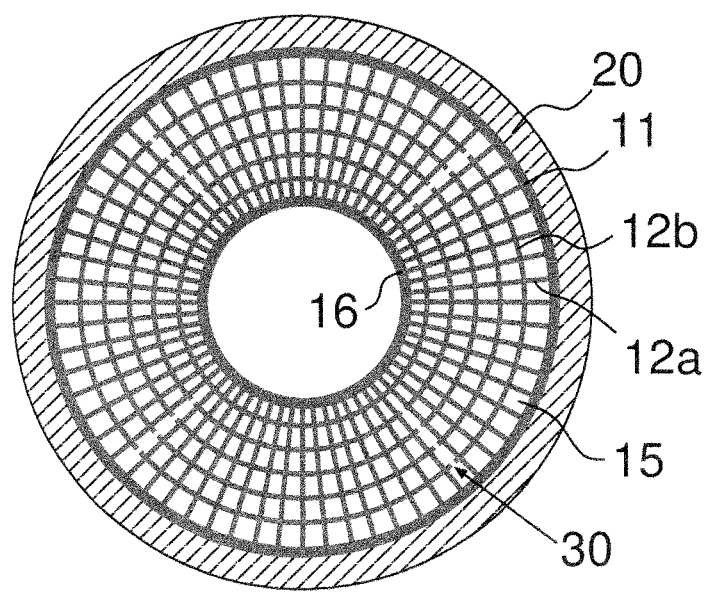
FIG. 10 is a cross-sectional view taken along the line c-c' in the heat exchange member shown in FIG. 9.

The partition walls 12 that form the hollow honeycomb structure 10a includes first partition walls 12a extending in a radial direction and second partition walls 12b extending in a circumferential direction in a cross section of the hollow honeycomb structure 10a orthogonal to a flow path direction for the first fluid (i.e., the cross section shown in FIG. 10). Such a structure can allow the heat of the first fluid to be transferred in the radial direction through the first partition walls 12a, so that the heat of the first fluid can be efficiently transferred to the outside of the hollow honeycomb structure 10a.

In the hollow honeycomb structure 10a having the structure described above, thermal stresses that are drawn in the circumferential direction are applied to the second partition walls 12b, the outer peripheral wall 11 and the inner peripheral wall 16 when the entire hollow honeycomb structure 10a undergoes thermal expansion in the radial direction. Since the thermal stresses drawn in the circumferential direction are higher than those drawn in the radial direction, the thermal stresses concentrate on the second partition walls 12b, the outer peripheral wall 11 and the inner peripheral wall 16, so that cracks are easily generated.

Therefore, a part of at least one of the outer peripheral wall 11, the inner peripheral wall 16 and the second partition walls 12b that form the honeycomb structure 10a is provided with slits 30. Thus, the provision of the slits 30 relaxes the thermal stresses applied to at least one of the outer peripheral wall 11, the inner peripheral wall 16 and the second partition walls 12b, thus suppressing the generation of cracks.

The slits 30 can be provided in a part of the second partition walls 12b, a part of the outer peripheral wall 11, a part of the inner peripheral wall 16, a part of them, or a part of all of them, where thermal stresses concentrate and cracks easily occur. Among them, it is preferable to provide the slits 30 in: (i) a part of the outer peripheral wall 11, the inner peripheral wall 16 and the second partition walls 12b; or (ii) a part of the outer peripheral wall 11 and the second partition walls 12b; or (iii) a part of the inner peripheral wall 16 and the second partition walls 12b; or (iv) a part of the second partition walls 12b; or (v) a part of the inner peripheral wall 16; it is more preferable to provide the slits 30 in (ii) a part of the outer peripheral wall 11 and the second partition walls 12b, in particular from the viewpoint of ensuring the strength while suppressing cracks in both the outer peripheral wall 11 and the second partition walls 12b.

The slits 30 are preferably slits 30 that are provided in a part of the second partition walls 12b and are continuous in the radial direction. Such slits 30 can be easily formed by a general processing method, thereby improving the productivity of the heat exchange member 300 and the heat conductive member.

Also, the slits 30 continuous in the radial direction may also be continuous on at least one of the outer peripheral wall 11 and the inner peripheral wall 16. Even in such a structure, the slits can be easily formed by a general processing method, thereby improving the productivity of the heat exchange member 300 and the heat conductive member.

The number of the first partition walls 12a of the hollow honeycomb structure 10a is preferably from 100 to 500, and more preferably from 200 to 300, in terms of the heat recovery efficiency. Furthermore, the number of the second partition walls 12b of the hollow honeycomb structure 10a is preferably from 100 to 3000, and more preferably from 300 to 2000, in terms of relaxing the thermal stress and ensuring the strength.

The thickness and material of the inner peripheral wall 16 can be the same as those of the outer peripheral wall 11.

Further, a diameter of the inner peripheral wall 16 in the cross section orthogonal to the flow path direction for the first fluid is preferably from 1 to 70 mm, and more preferably from 30 to 70 mm. If the cross-sectional shape of the inner peripheral wall 16 is not circular, the diameter of the largest inscribed circle inscribed in the cross-sectional shape of the inner peripheral wall 16 is defined as the diameter of the inner peripheral wall 16.

Also, a shape of a hollow portion formed on an inner side of the inner peripheral wall 16 may be, but not limited to, for example, a cylindrical shape, an elliptic pillar shape, a quadrangular pillar shape or other polygonal pillar shape. Thus, the shape of the hollow portion (i.e., the inner shape of the inner peripheral wall 16) in the cross section orthogonal to the flow path direction for the first fluid may be circular, elliptical, quadrangular or other polygonal. Although the outer peripheral shape of the hollow honeycomb structure 10a and the shape of the hollow portion (the inner peripheral wall 16) may be the same as or different from each other, it is preferable that they are the same as each other, in terms of resistance against external impact, thermal stress and the like.

The production methods for the heat exchange member 300 and the heat conductive member including the hollow honeycomb structure 10a are not particularly limited, and they can be carried out by the same method as that for the heat exchange member 100 and the heat conductive member as described above. The method of forming the slits 30 on the inner peripheral wall 16 can also be carried out by the same method as that of forming the slits 30 on the outer peripheral wall 11 and the second partition walls 12b.

The heat exchange member 300 and the heat conductive member according to Embodiment 2 of the present invention can be provided with the slits 30 in a part of at least one of the outer peripheral wall 11, the inner peripheral wall 16 and the second partition walls 12b that form the hollow honeycomb structure 10a to relax the thermal stress applied to at least one of the outer peripheral wall 11, the inner peripheral wall 16 and the second partition walls 12b, thereby achieving both improvement of the heat recovery efficiency and suppression of the increase in pressure loss, while suppressing the generation of cracks in the hollow the honeycomb structure 10a.

The heat exchanger according to Embodiment 2 of the present invention includes the heat exchange member 300 as described above. For example, the heat exchanger according to Embodiment 2 of the present invention may include the heat exchange member 300; and an outer cylinder (casing) at an interval on a radially outer side of the covering member 20 such that a second fluid can flow on the outer periphery of the covering member 20 of the heat exchange member 300.

Further, the method for producing the heat exchanger according to Embodiment 2 of the present invention is not particularly limited. The method can be carried out in the same manner as that for the heat exchanger 200 described above.

Since the heat exchanger according to Embodiment 2 of the present invention includes the heat exchanger member 300 as described above, it is possible to achieve both improvement of the heat recovery efficiency and suppression of the increase in pressure loss, while suppressing the generation of cracks in the hollow honeycomb structure 10a.

EXAMPLES

Hereinafter, the present invention will be described in more detail with reference to Examples, but the present invention is not limited to these Examples.

Examples 1 to 3

A green body containing SiC powder was extruded into a desired shape, dried, processed to have predetermined external dimensions, and impregnated with Si and fired to produce honeycomb structures each comprised of a Si—SiC material (si-impregnated SiC) containing a metal Si between SiC particles. The characteristics of the produced honeycomb structures are as follows.

Diameter in the cross section orthogonal to the flow path direction (axial direction) for the first fluid: 75 mm;
Length in the axial direction: 42 mm;
Number of first partition walls on the outer peripheral wall side: 200;
Number of second partition walls: 1500;
Thickness of the first partition wall: 0.3 mm;

Thickness of the second partition wall: 0.3 mm;
Number of second partition walls in the radial direction: 15;
Thickness of the outer peripheral wall: 1 mm;
Porosity of the first partition wall, the second partition wall, and the outer peripheral wall: 3%;
Isostatic strength: 200 MPa; and
Thermal conductivity (25° C.): 60 W/(m·K).

Figure 11:
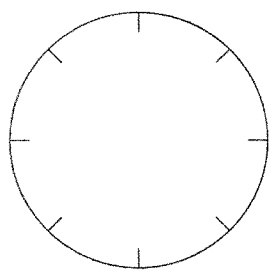
FIG. 11 is a view for explaining positions of slits in the honeycomb structures produced in Examples 1 to 3.
Figure 11:
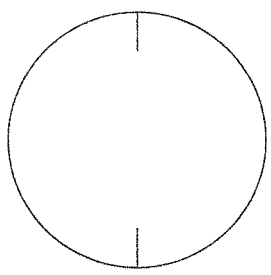
Figure 11:
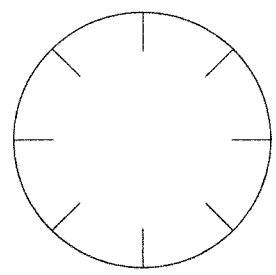

Next, slits continuous in the radial direction were formed in each of the produced honeycomb structures at the predetermined positions shown in FIG. 11 using a cutting process. It should be noted that FIG. 11 is a cross-sectional view of the honeycomb structure orthogonal to the axial direction, and any detailed structure other than the slits is omitted. In FIG. 11, each straight line in the circle represents each slit.

The length of each slit in the axial direction of the honeycomb structure was the same as the axial length of the honeycomb structure. Further, the slits continuous in the radial direction are provide on the outer peripheral wall and X second partition walls from the outer peripheral wall, and the number of slits in the circumferential direction was set to Y. The values of X and Y are shown in Table 1.

Comparative Example 1

A honeycomb structure was produced under the same conditions as those of Examples 1 to 3. In Comparative Example 1, no slit was formed in the honeycomb structure.

Each of the honeycomb structures obtained in the above Examples and Comparative Example was then subjected to shrinkage fitting into the covering member to produce a heat exchange member. As the covering member, a stainless steel tubular member (having a thickness of 1 mm) was used. Subsequently, the heat exchange member was used to produce a test jig similar to the heat exchange member having the structure shown in FIGS. 7 and 8 such that the second fluid flowed around the outer periphery of the heat exchanger member.

For the test jig produced as described above, a heat resistance test was conducted by allowing the first fluid to flow through the cells of the honeycomb structure and the second fluid to flow on the outer peripheral side of the covering member, respectively, and a temperature of a gas (first fluid) at which cracks were generated in the honeycomb structure was evaluated. In the heat resistance test, the gas (the first fluid) in which the temperature was increased by 100° C. from 500° C. to a maximum temperature of 1,000° C. was allowed to flow through the cells of the honeycomb structure at a flow rate of 100 g/s, and water (the second fluid) at 40° C. was allowed to flow on the outer peripheral side of the covering member at a flow rate of 10 L/min. The presence or absence of the generation of cracks was evaluated by observing the honeycomb structure with a microscope. The results of the evaluation are shown in Table 1.

TABLE 1

|  | Example 1 | Example 2 | Example 3 | Comparative Example 1 |
| --- | --- | --- | --- | --- |
| Number of Slits in Radial Direction: X | 2 | 4 | 4 | 0 |
| Number of Slits in Circumferential Direction: Y | 8 | 2 | 8 | 0 |
| Temperature of Gas at Cracking (° C.) | 900 | 900 | *1 | 700 |

(Remarks)
*1: No crack was generated.

As shown in Table 1, in the heat exchanger using the honeycomb structure having no slit formed, the cracks were generated in the honeycomb structure when the temperature of the gas (first fluid) was 700° C. (Comparative Example 1), whereas in the heat exchanger using the honeycomb structure having the slits, the temperature of the gas at which cracks were generated in the honeycomb structure was higher (Examples 1 and 2) or no crack was generated in the honeycomb structure (Example 3). Therefore, it is believed that the provision of the slits in the honeycomb structure makes it difficult for the cracks to be generated in the honeycomb structure.

As can be seen from Examples 1 to 3, by increasing the number of slits in the circumferential direction and the depth of the slits in the radial direction in a balanced manner, a honeycomb structure that does not generate the cracks can be created.

Examples 4 and 5

A green body containing SiC powder was extruded into a desired shape, dried, processed to have predetermined external dimensions, and impregnated with Si and fired to produce hollow honeycomb structures each comprised of a Si—SiC material (si-impregnated SiC) containing a metal Si between SIC particles. The characteristics of the produced hollow honeycomb structures are as follows.

Diameter in the cross section orthogonal to the flow path direction (axial direction) for the first fluid: 75 mm;
Diameter of the hollow portion (inner peripheral wall) in the cross section orthogonal to the flow path direction (axial direction) for the first fluid: 57 mm;
Length in the axial direction: 20 mm;
Number of first partition walls on the outer peripheral wall side: 250;
Number of second partition walls: 1000;
Thickness of the first partition wall: 0.3 mm;
Thickness of the second partition wall: 0.3 mm;
Number of second partition walls in the radial direction: 4;
Thickness of the outer peripheral wall and inner peripheral wall: 1 mm;
Porosity of the first partition wall, the second partition wall, the outer peripheral wall and the inner peripheral wall: 3%;
Isostatic strength: 200 MPa; and
Thermal conductivity (25° C.): 60 W/(m-K).

Figure 12:
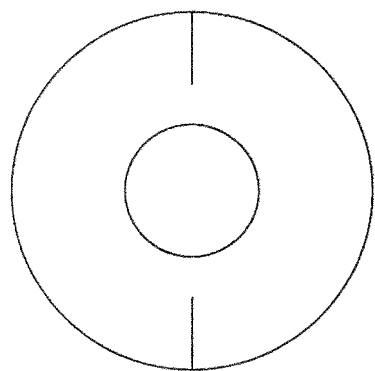
FIG. 12 is a view for explaining positions of slits in the hollow honeycomb structures produced in Examples 4 and 5.
Figure 12:
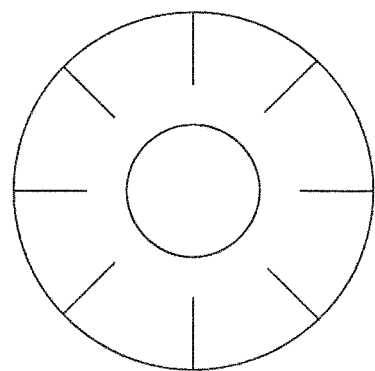

Next, slits continuous in the radial direction were formed in each of the produced hollow honeycomb structures at the predetermined positions shown in FIG. 12 using a cutting process. It should be noted that FIG. 12 is a cross-sectional view of the hollow honeycomb structure orthogonal to the axial direction, and any detailed structure other than the slits is omitted. In FIG. 12, each straight line in the circle represents each slit.

The length of each slit in the axial direction of the hollow honeycomb structure was the same as the axial length of the hollow honeycomb structure. Further, the slits continuous in the radial direction are provide on the outer peripheral wall and X second partition walls from the outer peripheral wall, and the number of slits in the circumferential direction was set to Y. The values of X and Y are shown in Table 2.

Comparative Example 2

A honeycomb structure was produced under the same conditions as those of Examples 4 and 5. In Comparative Example 2, no slit was formed in the hollow honeycomb structure.

Each of the hollow honeycomb structures obtained in the above Examples and Comparative Example was then subjected to shrinkage fitting into the covering member to produce a heat exchange member. As the covering member, a stainless steel tubular member (having a thickness of 1 mm) was used. Subsequently, the heat exchange member was used to produce a test jig similar to the heat exchange member having the structure shown in FIGS. 7 and 8 such that the second fluid flowed around the outer periphery of the heat exchanger member.

The test jig produced as described above was subjected to a heat resistance test in the same manner as described above, and the temperature of the gas (first fluid) at which cracks were generated in the honeycomb structure was evaluated. The results are shown in Table 2.

TABLE 2

|  | Example 4 | Example 5 | Comparative Example 2 |
|---|---|---|---|
| Number of Slits in Radial Direction: X | 2 | 2 | 0 |
| Number of Slits in Circumferential Direction: Y | 2 | 8 | 0 |
| Temperature of Gas at Cracking (° C.) | 900 | *1 | 700 |

(Remarks)
*1: No crack was generated.

As shown in Table 2, in the heat exchanger using the hollow honeycomb structure having no slit formed, the cracks were generated in the hollow honeycomb structure when the temperature of the gas (first fluid) was 700° C. (Comparative Example 2), whereas in the heat exchanger using the hollow honeycomb structure having the slits, the temperature of the gas at which cracks were generated in the hollow honeycomb structure was higher (Example 4), or no crack was generated in the hollow honeycomb structure (Example 5). Therefore, it is believed that the provision of the slits in the hollow honeycomb structure makes it difficult for the cracks to be generated in the hollow honeycomb structure.

As can be seen from the above results, according to the present invention, it is possible to provide a heat exchange member and a heat exchanger which can achieve both an increase in a heat recovery efficiency and suppression of an increase in pressure loss, while suppressing generation of cracks in the honeycomb structure. Also, according to the present invention, it is possible to provide a heat conductive member that can be mounted on the heat exchange member and the heat exchanger as described above.

DESCRIPTION OF REFERENCE NUMERALS

10 honeycomb structure
10a hollow honeycomb structure
11 outer peripheral wall
12a first partition wall
12b second partition wall
13 first end face
14 second end face
15 cell
16 inner peripheral wall
20 covering member
30 slit
40 outer cylinder
41 feed pipe
42 discharge pipe
100,300 heat exchange member
200 heat exchanger

The invention claimed is:

1. A heat exchange member, comprising:
   a honeycomb structure comprising: an outer peripheral wall; and partition walls arranged on an inner side of the outer peripheral wall, the partition walls defining a plurality of cells, each of the plurality of cells extending from a first end face to a second end face to form a flow path for a first fluid; and
   a covering member being configured to cover an outer peripheral surface of the outer peripheral wall,
   wherein in a cross section of the honeycomb structure orthogonal to a flow path direction for the first fluid, the partition walls comprise first partition walls extending in a radial direction and second partition walls extending in a circumferential direction,
   wherein a part of at least one of the outer peripheral wall and the second partition walls comprises at least one slit,
   wherein a thickness of each first partition wall is higher than a thickness of each second partition wall, and
   wherein the number of the slits in the circumferential direction is from 3 to 10.

2. The heat exchange member according to claim 1, wherein the slit is provided in (i) a part of the outer peripheral wall and the second partition walls, or (ii) a part of the second partition walls.

3. The heat exchange member according to claim 1, wherein a plurality of slits are provided in a part of the second partition walls, the plurality of slits extending in a continuous radial direction of the honeycomb structure.

4. The heat exchange member according to claim 3, wherein the slits continuous in the radial direction are also continuous with the outer peripheral wall.

5. The heat exchange member according to claim 1, wherein assuming that the number of the second partition walls in the radial direction is n, the plurality of slits extending in a continuous radial direction of the honeycomb structure are provided on n×0.3 or more second partition walls from the outer peripheral wall side; and
   wherein a product of n×0.3 is rounded to the nearest whole number.

6. A heat exchanger, comprising:
   the heat exchange member according to claim 1; and
   an outer cylinder arranged at an interval on a radially outer side of the covering member so that a second fluid can circulate around an outer periphery of the covering member.

7. The heat exchange member according to claim 1, wherein a number of first partition walls on an outer peripheral wall side of the honeycomb structure is 100 to 500.

8. A heat exchange member, comprising:
   a hollow honeycomb structure comprising: an outer peripheral wall; an inner peripheral wall; and partition walls arranged between the outer peripheral wall and the inner peripheral wall, the partition walls defining a plurality of cells, each of the plurality of cells extending from a first end face to a second end face to form a flow path for a first fluid; and
   a covering member being configured to cover an outer peripheral surface of the outer peripheral wall,
   wherein in a cross section of the honeycomb structure orthogonal to a flow path direction for the first fluid, the partition walls comprise first partition walls extending in a radial direction and second partition walls extending in a circumferential direction, wherein a part of at least one of the outer peripheral wall, the inner peripheral wall and the second partition walls comprises at least one slit, wherein a thickness of each first partition wall is higher than a thickness of each second partition wall, and wherein the number of the slits in the circumferential direction is from 3 to 10.

9. The heat exchange member according to claim 8, wherein a plurality of slits are provided in a part of the second partition walls, the plurality of slits extending in a continuous radial direction of the honeycomb structure.

10. The heat exchange member according to claim 9, wherein the slits continuous in the radial direction are also continuous with at least one of the outer peripheral wall and the inner peripheral wall.

11. The heat exchange member according to claim 8, wherein a number of first partition walls is 100 to 500.

12. A heat conductive member, comprising a honeycomb structure comprising: an outer peripheral wall; and partition walls arranged on an inner side of the outer peripheral wall, the partition walls defining a plurality of cells, each of the plurality of cells extending from a first end face to a second end face to form a flow path for a first fluid, wherein the outer peripheral wall and the partition walls comprise a Si—SiC material based on SiC particles as an aggregate, wherein a metal Si is contained between the SiC particles, wherein in a cross section of the honeycomb structure orthogonal to a flow path direction for the first fluid, the partition walls comprise first partition walls extending in a radial direction and second partition walls extending in a circumferential direction, wherein a part of at least one of the outer peripheral wall and the second partition walls comprises at least one slit, wherein a thickness of each first partition wall is higher than a thickness of each second partition wall, and wherein the number of the slits in the circumferential direction is from 3 to 10.

13. The heat conductive member according to claim 12, wherein the slit is provided in (i) a part of the outer peripheral wall and the second partition walls, or (ii) a part of the second partition walls.

14. The heat conductive member according to claim 12, wherein the slits continuous in the radial direction are provided in a part of the second partition walls, and wherein the slits continuous in the radial direction are also continuous with the outer peripheral wall.

15. The heat conductive member according to claim 12, wherein assuming that the number of the second partition walls in the radial direction is n, the plurality of slits extending in a continuous radial direction of the honeycomb structure are provided on n×0.3 or more second partition walls from the outer peripheral wall side; and wherein a product of n×0.3 is rounded to the nearest whole number.

16. The heat exchange member according to claim 12, wherein a number of first partition walls on an outer peripheral wall side of the honeycomb structure is 100 to 500.

17. A heat conductive member, comprising a hollow honeycomb structure comprising: an outer peripheral wall; an inner peripheral wall; and partition walls arranged between the outer peripheral wall and the inner peripheral wall, the partition walls defining a plurality of cells, each of the plurality of cells extending from a first end face to a second end face to form a flow path for a first fluid, wherein the outer peripheral wall, the inner peripheral wall, and the partition walls comprise a Si—SiC material based on SiC particles as an aggregate, wherein a metal Si is contained between the SiC particles, wherein in a cross section of the honeycomb structure orthogonal to a flow path direction for the first fluid, the partition walls comprise first partition walls extending in a radial direction and second partition walls extending in a circumferential direction, wherein a part of at least one of the outer peripheral wall, the inner peripheral wall and the second partition walls comprises at least one slit, wherein a thickness of each first partition wall is higher than a thickness of each second partition wall, and wherein the number of the slits in the circumferential direction is from 3 to 10.

18. The heat conductive member according to claim 17, wherein the slits continuous in the radial direction are provided in a part of the second partition walls, and wherein the slits continuous in the radial direction are also continuous with at least one of the outer peripheral wall and the inner peripheral wall.

19. The heat exchange member according to claim 17, wherein a number of first partition walls is 100 to 500.

* * * * *